Oct. 17, 1961 P. C. GOLDMARK ET AL 3,005,056

RECORDING REPRODUCING SYSTEM

Filed Feb. 2, 1956 2 Sheets-Sheet 1

INVENTORS
PETER C. GOLDMARK
JOHN W. CHRISTENSEN
BY
Campbell, Brumbaugh, Free & Graves
THEIR ATTORNEYS Oct. 17, 1961 P. C. GOLDMARK ET AL 3,005,056

RECORDING REPRODUCING SYSTEM

Filed Feb. 2, 1956 2 Sheets-Sheet 2

INVENTORS
PETER C. GOLDMARK
JOHN W. CHRISTENSEN
BY
Campbell, Brumbaugh, Free & Graves
THEIR ATTORNEYS United States Patent Office 3,005,056

Patented Oct. 17, 1961

3,005,056

RECORDING REPRODUCING SYSTEM

Peter C. Goldmark, New York, and John W. Christensen, Forest Hills, N.Y., assignors to Columbia Broadcasting System, Inc., New York, N.Y., a corporation of New York Filed Feb. 2, 1956, Ser. No. 563,075

2 Claims. (Cl. 179—100.2)

This invention relates generally to a recording-reproducing system, and more particularly to a system of this character wherein at least one signal transfer head sweeps transversely over a record sustaining tape to effect transfer of a signal between the tape and the head.

It is an object of this invention to make the best use of the record-sustaining area of a tape.

A further object of this invention is to reduce the longitudinal speed with which the tape must move in order to record or reproduce a signal of a given band width.

Another object of the invention is to record a periodic signal on the tape or to reproduce this signal from the tape in a manner which is related to the periodicity of the signal.

Still another object of the invention is to provide proper spatial phasing of the tape during longitudinal movement thereof.

These and other objects are realized according to the invention by providing a guide means defining a predetermined longitudinal path of movement for a record sustaining tape, drive means for moving said tape longitudinally in said path, and at least one signal transfer head adapted to successively sweep transversely over a predetermined transverse extent of the tape. To effect best use of the tape area, the transversely sweeping head may effect a signal transfer of a first signal having high frequency components between the tape and the head, while a second stationary head (past which the tape moves longitudinally) may effect the signal transfer of a second signal having only low frequency components between the tape and the second head. With or without the use of such second head, the recording of the signal having high frequency components transversely on the tape permits (in recording or reproducing this signal) a low longitudinal speed of the tape relative to the sweep speed required to record or reproduce the signal.

When a periodic signal is to be recorded or reproduced, this may be done advantageously according to the invention, irrespective of the frequency components of the signal, by operating the transversely sweeping head in synchronism with the periods of the signal, and by effecting a transfer of the signal between the head and the tape. If the signal is characterized by intervals which have negligible information content, space may be conserved on the tape by synchronizing the transversely sweeping head with these intervals so that the head is off the tape when such intervals occur.

Proper spatial phasing of the tape in its longitudinal movement may be accomplished according to the invention by recording on a longitudinal track of the tape a signal indicative of the relative positions between the tape and the transversely sweeping head at the times this head in recording sweeps over the tape. This longitudinally recorded signal is then reproduced during play back, and is utilized when so reproduced to re-establish during play back the relative positions which existed between the tape and the transversely sweeping head during recording.

For a better understanding of the invention, reference is made to the following description and to the accompanying drawings wherein.

In the discussion to follow certain references will be made to dimensional values, operating values and the like. It will be understood that while these values are characteristic of a practical operating embodiment of the invention, the values are exemplary values only, the invention being nowise limited in scope because these certain values are mentioned.

Figures 1, 3:
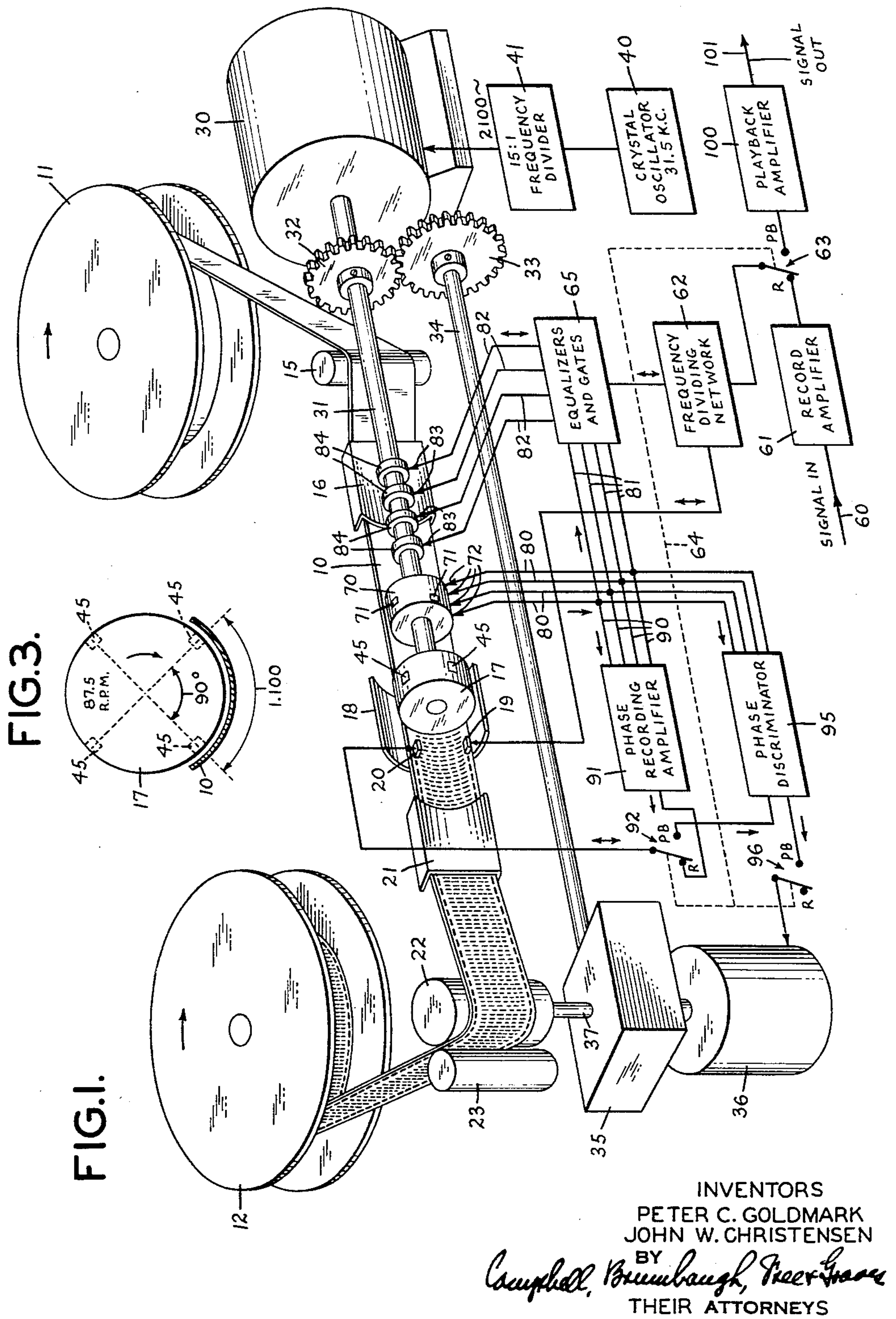
FIG. 1 is a diagram of one apparatus embodiment of the invention.
FIG. 3 is a diagrammatic view of certain relations between the transversely moving heads in the system of FIG. 1.

Referring now to FIG. 1, the reference numeral 10 designates a record sustaining tape as, say, a 35 mm. magnetic tape with a .0022 inch Mylar base. The tape 10 is adapted to move with a longitudinal velocity of 28 inches/second (140 feet/minute) from a feed reel 11 to a collector reel 12. These reels when in paired 10 inch, 18 inch and 24 inch sizes will yield approximately 21, 64 and 106 minutes of recording, respectively, with a tape of the type stated moving at the velocity stated. In applications where a small loss of recorded information is permissible (up to 1%), .006 inch acetate or paper back tape can be used with a reduction of the above recording time by a factor of approximately 3.

The path of longitudinal movement of tape 10 from reel 11 to reel 12 includes the following elements in the order named: an idler roll 15, a tape former 16, a head carrier 17 and nest 18 between which the tape passes, a head 19 and a control signal head 20 under each of which the tape passes, a tape reformer 21, and a capstan 22 and idler roll 23 between which the tape passes. The tape former 16 is adapted to bow the flat tape which it receives into a form wherein the tape transversely has a concave shape corresponding arcuately with the periphery of the head carrier 17. The nest 18 holds the concavely bowed tape in uniform contact with the peripheral surface of the carrier 17. The nest 18 is further adapted to eliminate sidewise motion of the tape with respect to the axis of carrier 17. Subsequent to passing carrier 17 and the heads 19, 20, the tape 10 before it reaches capstan 22 is returned to a flat condition by the tape reformer 21.

The system of FIG. 1 is set into motion by a motor 30 which through a shaft 31 rotates the head carrier 17. The motor 30 also transmits rotary motion to the capstan 22 by way of a precision gear reduction in the form of a pinion 32 on shaft 31, a pinion 33 meshing with pinion 32, a shaft 34 driven by pinion 33, a differential mechanism 35 receiving a first mechanical angular input from shaft 34 and a second mechanical angular input from a phase motor 36, and a shaft 37 conveying the mechanical angular output of the differential mechanism to the capstan 22. The capstan 22 thus imparts to tape 10 a longitudinal movement having a speed which is synchronized (subject to shifting in longitudinal space phase as hereinafter described) to the speed of rotation of the head carrier 17. The speeds of rotation of the feed reel 11 and the collection reel 12 are synchronized in a well-known manner with the longitudinal speed of tape 10 so that no undue slack or tension is created in the tape in the course of its travel between the two reels.

In the described system it is desirable that the speeds of movement of the various moving elements be kept constant to a high degree of precision. Such precision is necessary in order to avoid loss of signal between recording and reproduction. Essentially constant speeds are obtained in the system of FIG. 1 by having the motor 30 take, for example, the form of a 48 pole synchronous motor and by having the motor driven, for example, from a 2,100 cycle crystal controlled power source comprising a 31.5 kc. crystal oscillator 40 and a 15:1 frequency divider 41. When energized by the described power source, the 48 pole motor 30 rotates the head carrier 17 at 87.5 r.p.s. (5,250 r.p.m.). The large number of poles on the motor together with proper damping (anti-hunt) and low moment of inertia of the rotating system insures smooth hunt-free operation.

To provide transverse recording on tape 10 (and transverse reproduction therefrom) a plurality (4) of heads 45 are mounted equiangularly (90° spacing between adjacent heads) in the same radial plane around the periphery of the head carrier 17. With four heads 45 and a rotation of carrier 17 at 87.5 r.p.s., the tape 10 will be swept transversely at the rate of 350 sweeps/second. In the present instance, the diameter of the carrier is 1.40 inches to give an arcuate spacing of 1.100 inches between adjacent heads 45. The heads 45 themselves each have a pole width of .060 inch and a gap of .0001 inch. The heads 45 are mounted flush with the peripheral surface of carrier 17, thus presenting a continuous smooth surface to the tape 10. Adjusting means (not shown) is provided within the carrier for accurate positioning of the heads.

As further described in more detail, each of the heads 45 is adapted to effect a signal transfer (recording or reproduction) with the tape 10 when sweeping over a preselected transverse extent 50 (FIG. 2) of the tape. Within this extent 50 the heads 45 record signal variations occurring in the course of time in a succession of longitudinally spaced, transversely running tracks 51. Each of these tracks is .060 inch. wide, extends 1.150 inches transversely of the tape and is separated from adjacent tracks by .020 inch wide guard bands. As later more fully described, only 1.100 inches of each track is actually used, the remainder of the track being used for guard band purposes.

The head 19 is disposed to record signal variations on tape 10 (and to reproduce these variations therefrom) in a longitudinal track 52 lying between the transverse extent 50 and one of the outer edges of the tape. The control signal head 20 is similarly disposed to cooperate (for signal recording and reproducing purposes) with tape 10 in a longitudinal track 53 disposed between the extent 50 and the other outer edge of the tape 10. The heads 19 and 20 each have poles .060 inch wide and each employ a gap of .0006 inch. The tracks 52, 53 respectively corresponding with these heads are of .060 inch width. Each of these last-named tracks are separated by a guard band of .035 inch from the transverse extent 50, and by a guard band of .019 inch from the adjacent outer edge of the tape 10.

As one application, the above-described system is adapted to record and reproduce a wide band signal as, say, a signal with a band width extending from 40 cycles/second to 5 megacycles/second. This wide band signal is supplied as an input to the system on a lead 60 (center and low in FIG. 1), is amplified by an amplifier 61, and is then fed to a frequency dividing network 62 through a section 63 of a recording-play back switch (represented by the dotted mechanical linkage line 64) when the switch 64 is in recording position. The frequency dividing network 62 splits the bandwidth of the input wide band signal into a narrow band signal (40–2000 cycles/second) and a broad band signal (2000 cycles/second-5 megacycles/second). These two signals have related information contents in that their respective information contents represent components of the entire information provided by the wide band signal. The narrow band signal is supplied directly to the head 19 to be recorded thereby in the longitudinal track 52 (FIG. 2) on the tape 10. The broad band signal is supplied from the frequency dividing network 62 to the equalizer circuits and gating circuits represented in FIG. 1 by the block 65.

To record the broad band signal transversely on the tape from the heads 45 on carrier 17, the broad band signal must be applied to the heads in a repeating succession wherein the signal is applied to each head in turn as it sweeps over the transverse extent 50 of the tape. To this end there is provided a timing means in the form of a drum 70 mounted on shaft 31 to rotate with the carrier 17, a plurality of contactors 71 (equal in number to the number of heads 45) having equal arcuate spacings around the periphery of the drum 70 and having different longitudinal spacings on the periphery of the drum, and a plurality of brushes 72 disposed in a longitudinal line and spaced apart in this line so that each brush 72 makes one closure with a respective contactor 71 each time drum 70 undergoes a full revolution. The contactors 71 and brushes 72 are adapted by conventional electric circuit practice to generate short duration electrical pulses on the brushes as each contactor makes closure with its corresponding brush. Thus a repeating succession of pulses will be generated on the brushes, the number of pulses in each revolution of drum 70 corresponding to the number of heads 45 on carrier 17.

Figure 2:
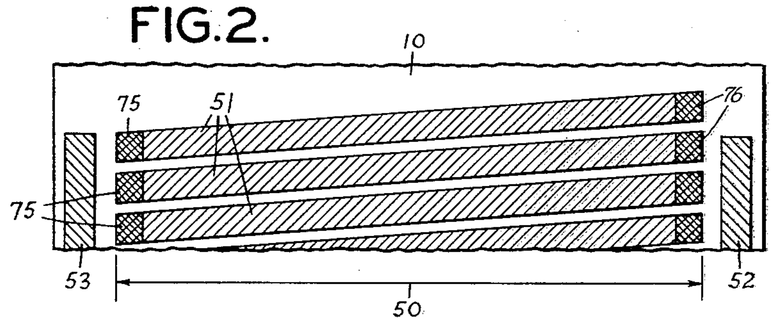
FIG. 2 is a representation of various recording tracks on the tape of the system shown in FIG. 1.

As shown in FIGS. 2 and 3 the predetermined transverse extent 50 upon which the heads 45 may record is slightly greater in dimension (1.150 inches) than the arcuate spacing (1.100 inches) on the carrier 17 between adjacent heads 45. Thus, each track 51 in the transverse extent 50 has at one end a guard band 75 (.05 inch) and at the other end a guard band 76 (.05 inch). The contactor 71 on the drum 70 and the brushes 72 are phased in angular position relative to the heads 45 on carrier 17 so that a first pulse is generated on a brush 72 when a first head 45 occupies a guard band 75 on a track 51, the next pulse is generated on another brush 72 when the first-named head occupies a guard band 76 on its track 51 and the next head 45 (to sweep the tape) occupies a guard band 75 on the next track 51, and so on.

Figure 4:
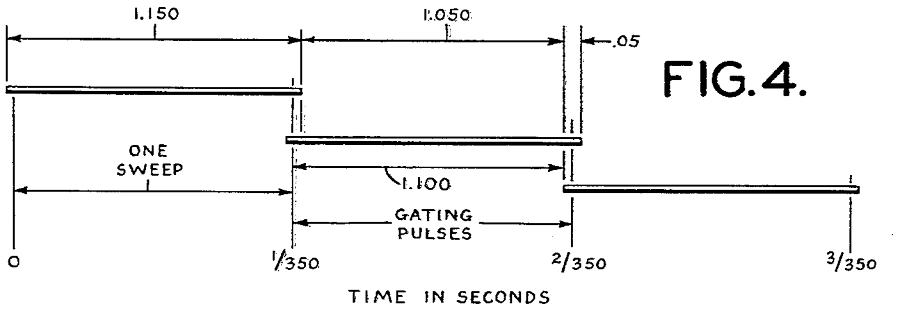
FIG. 4 is a diagram illustrating certain timing relations in the operation of the system of FIG. 1.

For a further disclosure of the relations between the transverse extent 50 of the tape, the arcuate spacings of the heads 45, the guard bands 75, 76, and the pulses developed by brushes 72, reference is made to FIG. 4.

The pulses developed by the brushes 72 occur in a repeating succession. These pulses are applied by way of leads 80 and 81 to the gating circuits in the block 65. These gating circuits are conventional gating circuits which in a well-known manner respond to the input pulses to switch the broad band signal input to the gating circuits from one to another of a set of output leads 82. Each of the output leads 82 is in electrical contact through a brush 83 with a slip ring 84 on the shaft 31. Each slip ring 84 is connected to a respective head 45 on the carrier 17. Thus, the broad band signal will be switched by the gating circuits to one after another of the heads 45 to be recorded on a transverse track 51 of the tape 10. In this switching of the broad band signal from one to another of heads 45, the elements which determine the order of switching are appropriately connected so that the broad band signal is applied to the heads 45 in a repeating succession wherein the signal is applied to each head in turn as it commences its sweep over the transverse extent 50 of the tape 10. As each head 45 finishes its sweep over extent 50 in a given track 51, the gating pulse developed at this time causes the broad band signal to be switched over to the head 45 which is just beginning its sweep over the transverse extent 50 in the next track 51. Thus the broad band signal will be recorded in a succession of transverse tracks 51.

As stated, the gating pulses are developed when one head 45 occupies a guard band 76 and the head 45 which is next in order to record occupies a guard band 75. The presence of these guard bands lessens the accuracy required of the gating pulses, since (in the application of the system presently described) gating may be performed at any time during which the heads lie in the guard bands. The form of gating used is high-speed gating, similar to that used in television montage, in order to provide for minimum loss of information.

To assure uniform recording and play back characteristics, the block 65 includes a separate equalizer circuit for each head 45.

In reproducing the broad band signal, it is desirable that each transverse track 51 on tape 10 register exactly in its longitudinal position with the head 45 which is sweeping over the tape 10 to reproduce the signal in the track. In other words, it is necessary in reproduction to duplicate the longitudinal relative positions which existed between the tape 10 and the several heads 45 as these heads swept over the tape to record the broad band signal. To the end of re-establishing these relative positions during reproduction, the pulses generated at the brushes 72 are supplied via leads 80 and 90 to a common input of an amplifier 91, are amplified therein, and are then supplied to the control signal head 20 by way of a section 92 of the recording-play back switch 64 when this switch is in recording position. The head 20 thus records longitudinally on track 53 (FIG. 2) a signal indicative of the respective relative positions of the tape 10 with the several heads 45 as these heads in turn record transversely on the tape. In other words, the head 20 records a control signal indicative of the longitudinal phasing in space (relative to the heads 45) which the longitudinal movement of the tape should have to obtain proper reproduction. In the present instance, this control signal takes the form of a series of pulses, each pulse representing the time when a head 45 sweeps over the transverse extent 50 of the tape. It will be noted that these recorded pulses represent the paramater time (i.e., the respective times when the heads 45 sweep over the tape) in terms of the respective longitudinal positions at which the pulses are recorded on the tape.

During play back, the recorded pulses pass under the head 20 at times which are determined by the longitudinal positions of the recorded pulses on the tape. Each time a recorded pulse passes under head 20, a pulse is generated in head 20. The times at which these generated pulses appear is indicative, for the longitudinal positions which the tape has at these times relative to heads 45, of the times when heads 45 should sweep over tape 10. Also, the times at which these pulses appear is a measure of the amount by which the longitudinal position of the tape 10 should be corrected in order to bring about proper tracking (during play back) between the tape 10 and the heads 45, if the timing of the sweeps of these heads is fixed. In fact, it is, to some extent, a matter of indifference whether proper tracking is brought about by shifting the angular phase of the transverse sweeps of head 45 to accommodate these sweeps to a longitudinal movement of the tape which is unregulated as to longitudinal phase position, or by shifting the spatial phase of the tape in the longitudinal movement to accommodate sweeps of the heads 45 which are fixed in angular phase. In the presently described embodiment, the latter course is employed.

The pulses generated by head 20 are fed, during play back, through the section 92 of recording-play back switch 64 in play back position to a phase discriminator 95 to provide one input to this discriminator. The discriminator 95 receives, during play back, another input of the repeating succession of pulses generated during play back, by the brushes 72. The phase discriminator 95 operates in a well-known manner to develop an error signal indicative of the sense and magnitude of the difference in timing between the pulses received thereby from head 20 and the pulses received thereby from brushes 72. It will be seen that this difference in timing is a measure of the amount by which the tape in its longitudinal movement must be corrected in its spatial phase relation (relative to heads 45) in order to duplicate during play back, the relative positions which existed between the tape 10 and the heads 45 during recording.

To effect this correction in the spatial phase of the longitudinal tape movement, the error signal from discriminator 95 is supplied, during play back, by way of a section 96 of recording-play back switch 54 to the phase motor 36. The motor 36 is a conventional two-phase induction motor which is held stationary during recording but which during play back, responds to the error signal in a well-known manner to provide a mechanical angular output corresponding to the mentioned difference in timing between the pulses received at the separate inputs of the phase discriminator. The angular output of the phase motor is injected into the differential mechanism 35 which responsively shifts the space phase of tape 10 as it moves longitudinally in a manner tending to reduce to zero value the difference in timing between the pulses at the two inputs to the discriminator. When this zero difference in timing is reached, a given transverse track 51 on the tape will exactly register with the head 45 which is then sweeping transversely over the tape 10. The tape 10 is thus continuously maintained in proper phasing with respect to the heads 45 as the tape moves longitudinally. It will be recognized that this proper phasing of the tape is obtained by the use of a follow-up principle operating through a closed loop servo-system.

From the discussion heretofore, the remainder of the operation of the system of FIG. 1 during play back will be largely self-evident. In play back, the gating circuits in block 65 re-assemble into a continuous signal the separate durations of the broad band signal which are recorded on successive transverse tracks 51 on the tape. This re-assembled broad band signal is supplied as one input to the network 62 which also receives an input of the narrow band signal from the head 19. The network 62, during playback, combines the received broad band and narrow band signals to resynthesize the wide band signal which was originally supplied to the system on lead 60. The resynthesized wide band signal is passed by way of the switch section 63 in play back position to an amplifier 100 and is amplified therein to appear on a lead 101 representing the play back output for the system.

Figure 5:
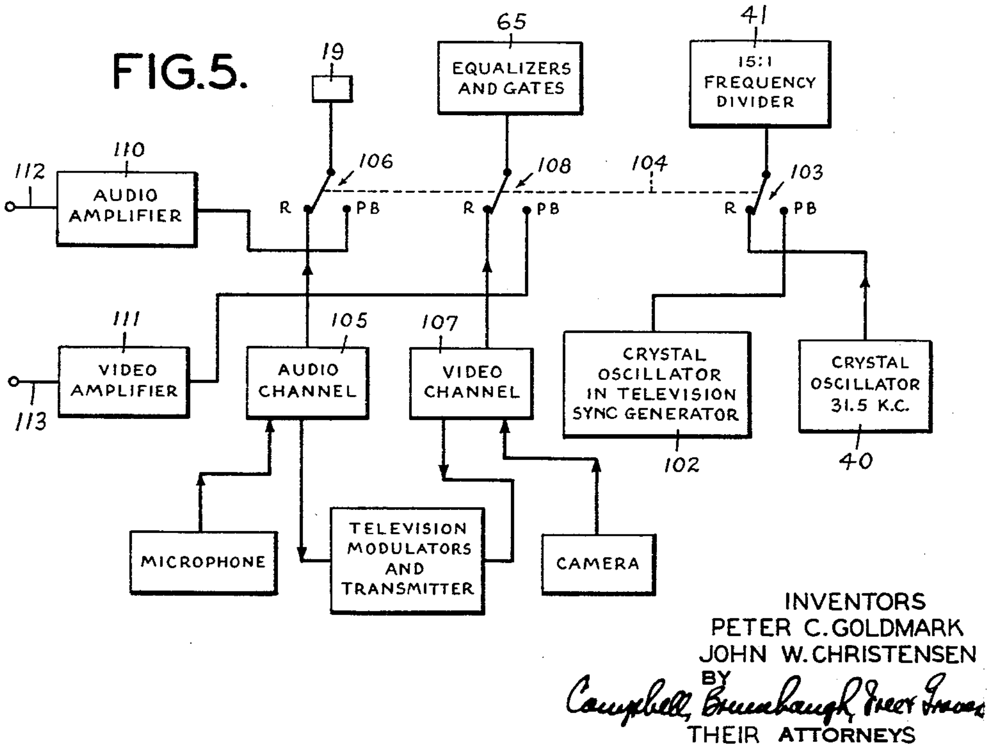
FIG. 5 is a diagram supplementing FIG. 1 to show the connections of the system of FIG. 1 for recording or reproducing a television program.

The above-described system is also of useful application in the simultaneous recording of signals which have related information contents in that the signals, for example, respectively, represent the audio signal and the video signal of a television program. If it is so desired to record a television program, the system of FIG. 1 is connected as shown in FIG. 5 so that the crystal oscillator 102 in the television "sync" generator drives the frequency divider 41 by way of a section 103 of a ganged record-play back switch 104 when in "record" position, the modulating audio signal is fed from the audio channel 105 through a section 106 of switch 104 to the head 19, and the modulating video signal is fed from the video channel 107 through a section 108 of switch 104 to the block 65 which includes the equalizing and gating circuits. Thus the audio signal will be recorded longitudinally in a single longitudinal track on tape 10, while the video signal will be recorded in a succession of transverse tracks on the tape 10.

As is well-known, the video signal is a periodic signal most of whose periods each comprise an interval wherein the signal is substantially unmodulated by information (the horizontal blanking interval) and an interval wherein the signal is modulated by information (the transmission interval). The periods of the video signal are synchronized with the oscillations of the crystal oscillator 102. By virtue of the FIG. 5 connections, the rotation of the motor 30 is also synchronized in frequency and phase with the oscillations of the oscillator 102. Accordingly, there will be a synchronous relation between the periods of the video signal and the movements of the heads 45 as they sweep over the transverse extent 50 of the tape 10. According to the invention in one of its aspects, this synchronous relation is made such that each recording sweep of a head 45 over the transverse extent 50 starts between two adjacent transmission intervals and ends between two adjacent transmission intervals so that any track 51 on the tape includes only integral transmission intervals, and so that the same number of integral transmission intervals (and signal periods) is included within each track 51 on the tape. For example, a duration of video signal representing 45 integral horizontal lines may be recorded on each track 51.

Further, according to the invention in one of its aspects, the dimension of the transverse extent 50, the dimension of the arcuate spacing on carrier 17 between adjacent heads 45, the angular phasing on the carrier 17 of the heads 45 with respect to the transverse extent 50, and the timing of the pulses generated at brushes 72 are mutually related to each other so that, for the signal period during which a sweep over extent 50 is started by a head 45, the head 45 is to one side of the extent 50 for a substantial portion of the blanking interval of this signal period, the head 45 only coming into registry with the transverse extent 50 towards the end of the blanking interval. The advantage in so having the head 45 to one side of the extent 50 for a portion of the blanking interval in the period occurring at the start of the head sweep is that the dimensional value of the extent 50 (and hence the transverse dimension of the tape 10) can be made smaller than where the head sweeps over the extent of the tape reserved for transverse recording during the whole of the mentioned blanking interval. It will be appreciated that this transverse saving of space on the tape increases relative to the size of extent 50 as the number of integral horizontal lines recorded in a single track diminishes, the space saving being a maximum when only one horizontal line is recorded in each track 51.

Assuming that a television program has been recorded, as described, by the system of FIG. 1, the system can be used to play back the television program by throwing the recording-play back switch 104 to play back position. With switch 104 so thrown, the switch section 103 connects oscillator 40 to the frequency divider 41 (FIG. 5) so that the motor 30 (FIG. 1) is rotated in synchronism with the oscillations of this oscillator. Also, when switch 104 is so thrown, the switch section 106 connects the head 19 to an audio signal amplifier 110, while the switch section 108 connects the equalizing and gate circuits of block 65 to a video amplifier 111, all in the manner shown in FIG. 5. Accordingly, the audio signal reproduced by head 19 will be amplified by amplifier 110 to provide an audio signal output for the system on a lead 112. Similarly, the video signal reproduced by heads 45 (FIG. 1) and re-assembled by the gate circuits in block 65 (FIG. 5) will be amplified by the amplifier 111 to appear on a lead 113 as a video signal output for the system.

The best use of the tape area for recording and reproduction purposes can be obtained in accordance with the following considerations. Inasmuch as the minimum velocity between tape and head required to record or reproduce a given signal varies directly as the highest frequency component thereof the presently described system is characterized by the relation:

$$\frac{v}{V}=\frac{f}{F} \qquad (1)$$

where $v$ and V are the minimum permissible longitudinal and transverse recording velocities, and $f$ and F are the highest frequency components respectively included within the band widths of the longitudinally and transversely recorded signals. Where a television program is recorded the frequency $f$ of the audio signal is fixed so that the minimum velocity $v$ in inches/second necessary to properly record the audio signal is also fixed. Of course it is desirable to use minimum permissible velocity of $v$ in order that the area of the tape be used to best advantage. Under these conditions the maximum number N of transverse tracks which can be laid down per second on the tape is given by the expression:

$$N=v/s \qquad (2)$$

where the term $s$ is assumed fixed in value and represents the longitudinal width in inches (including necessary guard space) required between center lines of adjacent transversely running tracks. The determination of N in this manner permits determination of the proper transverse width (from edge to edge) of the tape. The tape must have an edge-to-edge width which (when guard space and longitudinal tracks are taken into account) furnishes, for transverse recording, a transverse extent $l$ whose value in inches can be determined from the expression:

$$V=Nlk \qquad (3)$$

In (3), $k$ is the value of the ratio $T/t$ wherein T is the entire duration of the transversely recorded signal from one sweep to the next of the heads 45, and $t$ is that duration for which a head 45 is recording within the mentioned entire duration. In the described mode of recording the wide band signal, $k$, to a good approximation, equals 1, since substantially no duration of the signal is omitted from the recording of the signal on the tape by the heads 45. In recording the video signal in the manner described, T represents a duration of 45 horizontal lines, whereas $t$ is of slightly less duration, since, as described, a portion of the duration of a blanking interval is omitted at the start of the sweep by the head 45. Hence, when a video signal is recorded as described, $k$ has a value slightly greater than 1.

Note in expression (3) that the value of $l$ is fixed, for the reasons that the value of N is fixed (as heretofore described), $k$ can be assumed fixed in value, and V at least in its minimum value (which is the value desired to best use the tape area) is fixed at that value necessary to record the frequency F of the transversely recorded signal without unacceptable loss.

Expression (2) can be rewritten as follows:

$$V=Ns \qquad (4)$$

Substituting the equivalent values for $v$ and V in expressions (3) and (4) into (1), we get $$\frac{s}{lk}=\frac{f}{F} \qquad (5)$$

Expression (5) completes the information necessary to determine how to record or reproduce in a manner making the best use of the available area of the tape. If $s$ and $l$ are proportioned in accordance with (5), and if recording (or reproduction) is done at the minimum velocities $v$ and V necessary for recording or reproduction of the frequencies $f$ and F without unacceptable loss, the whole record sustaining area of the tape will be used to best advantage. In other words, there will be no area of the tape which might have been recorded on and was not.

The above-described method and apparatus embodiments being exemplary only, it will be understood that the invention comprehends method or apparatus embodiments differing in form or detail from the above described embodiments. For example, as already stated, the signals respectively recorded longitudinally and transversely on the tape need not necessarily have a narrow and broad band width relation. The described system is also of advantage where there are two signals of which the first contains only relatively low frequency components and the second (whether narrow band or broad band) contains frequency components which are relatively high. In this case the first signal would be recorded longitudinally and the second transversely. Irrespective of whether a signal having only low frequency components is recorded longitudinally, the invention is of useful application in recording transversely a signal with high frequency components. The particular advantage in so recording such signal is that the longitudinal velocity required for the tape is reasonable, whereas, if the signal with high frequency components were recorded longitudinally, excessive values of longitudinal velocities would be required to record and reproduce these high frequencies without loss.

Irrespective of whether or not a periodic signal to be recorded as high frequency components, the invention is of useful application in that, in accordance therewith, the signal is recorded transversely so that the form of recording, inasmuch as it is periodic (i.e., successive transverse tracks instead of a continuous longitudinal track), is congruous with the periodic form of the signal. Also, whatever the form or frequency composition of the signal, if the signal is recorded transversely, the invention is of highly useful application inasmuch, as in accordance therewith, there may be provided proper control with respect to the relative positions of the tape and one or more transversely sweeping heads during play back by these one or more heads.

Accordingly the invention is not to be considered as limited save as is consonant with the scope of the following claims.

We claim:

1. Apparatus for reproducing a signal recorded on a tape in the form of successive longitudinally-spaced, transversely-running record tracks, said apparatus comprising, a capstan adapted by rotation thereof to move said tape longitudinally through a reproducing zone, a reproducing head adapted by successively sweeping transversely through said zone and over said tape to reproduce said signal from said tracks, means to provide respective phase indications of the longitudinal positions on said tape of said tracks and of the instaneous transverse positioning of said head, a differential mechanism having first and second rotatable input shafts and a third rotatable output shaft of which the latter is coupled to said capstan to rotate it in proportion to the difference in the respective rotations of said first and second shafts, means to rotate said first shaft in phase synchronism with the transverse sweepings of said head to render the instantaneous rotational positioning of said capstan in constant phase relation with the instantaneous transverse positioning of said head while said second shaft is stationary, phase discriminator circuit means responsive to separate inputs of said two indications to produce at an output therefor an error signal of which the polarity and magnitude correspond to, respectively, the sense and the magnitude of the difference in time phase between said indications, and a phase motor directly connected between said output and said second shaft to translate said error signal into a rotation of said second shaft characterized by synchronization between the instantaneous angular phase of such shaft and said difference in the phase between said quantities, the said rotation at said second shaft being adapted by varying said otherwise constant phase relation to adjust the instantaneous longitudinal position of said tape so as to render recorded tracks thereon passing through said reproducing zone in longitudinal registration with said head.

2. Apparatus for reproducing a signal recorded on a tape in the form of successive longitudinally-spaced, transversely-running record tracks, said apparatus comprising, a capstan adapted by rotation thereof to move said tape longitudinally through a reproducing zone, a drive motor, a reproducing head driven by said motor to successively sweep transversely through said zone and over said tape to reproduce said signal from said tracks, means to provide respective phase indications of the longitudinal positions on said tape of said tracks and of the instantaneous transverse positioning of said head, a differential mechanism having first and second rotatable input shafts and a third rotatable output shaft of which the latter is coupled to said capstan to rotate it in proportion to the difference in the respective rotations of said first and second shafts, a gear train coupled between said drive motor and differential mechanism and driven by the former to impart to said first shaft a rotation which is synchronized in phase with the transverse sweepings of said head to render the instantaneous rotational positioning of said capstan in constant phase relation with the instantaneous transverse positioning of said head, phase discriminator circuit means responsive to separate inputs of said two indications to produce at an output therefor an error signal of which the polarity and magnitude correspond to, respectively, the sense and the magnitude of the difference in time phase between said indications, and a phase motor directly connected between said output and said second shaft to translate said error signal into a rotation of said second shaft characterized by synchronization between the instantaneous angular phase of such shaft and said difference in the phase between said quantities, the said rotation at said second shaft being adapted by varying said otherwise constant phase relation to adjust the instaneous longitudinal position of said tape so as to render recorded tracks thereon passing through said reproducing zone in longitudinal registration with said head.

References Cited in the file of this patent

UNITED STATES PATENTS

| | | |
|---|---|---|
| 2,245,286 | Marzocchi | June 10, 1941 |
| 2,677,012 | Bach | Apr. 27, 1954 |
| 2,678,821 | Masterson | May 18, 1954 |
| 2,698,875 | Greenwood | Jan. 4, 1955 |
| 2,773,120 | Masterson | Dec. 4, 1956 |
| 2,866,012 | Ginsburg | Dec. 23, 1958 |
| 2,876,295 | Irby | Mar. 3, 1959 |
| 2,900,444 | Camras | Aug. 18, 1959 |
| 2,956,114 | Ginsburg et al. | Oct. 11, 1960 |
| 2,963,555 | Brubaker | Dec. 6, 1960 |